United States Patent
Zhao et al.

(10) Patent No.: US 11,743,457 B2
(45) Date of Patent: *Aug. 29, 2023

(54) INTRA INTERPOLATION FILTER FOR MULTI-LINE INTRA PREDICTION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,044

(22) Filed: Oct. 1, 2020

(65) Prior Publication Data
US 2021/0021822 A1    Jan. 21, 2021

Related U.S. Application Data

(63) Continuation of application No. 16/202,902, filed on Nov. 28, 2018, now Pat. No. 10,834,393.
(Continued)

(51) Int. Cl.
*H04N 19/117* (2014.01)
*H04N 19/105* (2014.01)
(Continued)

(52) U.S. Cl.
CPC ............ *H04N 19/117* (2014.11); *G06T 5/002* (2013.01); *G06T 5/003* (2013.01); *G06T 5/20* (2013.01);
(Continued)

(58) Field of Classification Search
CPC .. H04N 19/117; H04N 19/132; H04N 19/159; H04N 19/105; H04N 19/176;
(Continued)

(56) References Cited

U.S. PATENT DOCUMENTS

2008/0123974 A1 * 5/2008 Zhu ..................... H04N 19/61
382/234
2012/0082224 A1 * 4/2012 Van Der Auwera ..........................
H04N 19/593
375/E7.243
(Continued)

FOREIGN PATENT DOCUMENTS

EP    3477951 A1 *  5/2019  ............. H04N 19/10
EP    3477951 A1    5/2019
(Continued)

OTHER PUBLICATIONS

Kang et al. Joint Video Experts Team (JVET) of ITU-T SG 16 WP 3 and ISO/IECJTC 1/SC 29/WG 11 10th Meeting: San Diego, US, Apr. 10-20, 2018 (Year: 2018).*
(Continued)

*Primary Examiner* — Richard A Hansell, Jr.
(74) *Attorney, Agent, or Firm* — Sughrue Mion, PLLC

(57) ABSTRACT

A method and apparatus for selecting an intra interpolation filter for multi-line intra prediction based on a reference line index for decoding a video sequence includes identifying a set of reference lines associated with a coding unit. A first type of interpolation filter is applied to reference samples included in a first reference line, of the set of reference lines, that is adjacent to the coding unit to generate a first set of prediction samples based on the first reference line being associated with a first reference line index. A second type of interpolation filter is applied to reference samples included in a second reference line, of the set of reference lines, that is non-adjacent to the coding unit to generate a second set of
(Continued)

110 — Identify a set of reference lines associated with a coding unit

120 — Apply a first type of interpolation filter to reference samples included in a first reference line, of the set of reference lines, that is adjacent to the coding unit to generate a first set of prediction samples based on the first reference line being associated with a first reference line index 130 — Apply a second type of interpolation filter to reference samples included in a second reference line, of the set of reference lines, that is non-adjacent to the coding unit to generate a second set of prediction samples based on the second reference line being associated with a second reference line index prediction samples based on the second reference line being associated with a second reference line index.

20 Claims, 6 Drawing Sheets

Related U.S. Application Data

(60) Provisional application No. 62/729,395, filed on Sep. 10, 2018.

(51) Int. Cl.
| | |
|---|---|
| *H04N 19/159* | (2014.01) |
| *H04N 19/132* | (2014.01) |
| *G06T 5/00* | (2006.01) |
| *G06T 5/20* | (2006.01) |
| *H04N 19/176* | (2014.01) |

(52) U.S. Cl.
CPC ......... *H04N 19/105* (2014.11); *H04N 19/132* (2014.11); *H04N 19/159* (2014.11); *G06T 2207/20192* (2013.01); *H04N 19/176* (2014.11)

(58) Field of Classification Search
CPC G06T 5/20; G06T 5/003; G06T 5/002; G06T 2207/20192
See application file for complete search history.

(56) References Cited

U.S. PATENT DOCUMENTS

| | | | | |
|---|---|---|---|---|
| 2013/0003832 | A1* | 1/2013 | Li | H04N 19/182 375/E7.243 |
| 2014/0058528 | A1* | 2/2014 | Contreras-Vidal | A61B 5/291 600/383 |
| 2016/0295243 | A1* | 10/2016 | Ashrafi | H04N 19/186 |
| 2016/0330478 | A1* | 11/2016 | Jeon | H04N 19/85 |
| 2017/0347093 | A1* | 11/2017 | Yu | H04N 21/234363 |
| 2017/0353730 | A1* | 12/2017 | Liu | H04N 19/159 |
| 2017/0359595 | A1* | 12/2017 | Zhang | H04N 19/176 |
| 2018/0091825 | A1* | 3/2018 | Zhao | H04N 19/117 |
| 2018/0295361 | A1* | 10/2018 | Kim | H04N 19/44 |
| 2018/0324417 | A1* | 11/2018 | Karczewicz | H04N 19/82 |
| 2018/0332284 | A1* | 11/2018 | Liu | H04N 19/70 |
| 2019/0141318 | A1* | 5/2019 | Li | H04N 19/11 |
| 2019/0238835 | A1* | 8/2019 | Lee | H04N 19/176 |
| 2020/0007870 | A1* | 1/2020 | Ramasubramonian | H04N 19/176 |
| 2020/0007895 | A1* | 1/2020 | Van der Auwera | H04N 19/59 |
| 2020/0014922 | A1* | 1/2020 | Ramasubramonian | H04N 19/91 |
| 2021/0120240 | A1* | 4/2021 | Bross | H04N 19/117 |

FOREIGN PATENT DOCUMENTS

| | | | |
|---|---|---|---|
| WO | 2017190288 A1 | 11/2017 | |
| WO | WO-2017190288 A1 * | 11/2017 | ........... H04N 19/105 |
| WO | WO-2020002641 A1 * | 1/2020 | ........... H04N 19/105 |

OTHER PUBLICATIONS

Jiang et al. Joint Video Experts Team (JVET) of ITU-T SG 16 WP 3 and ISO/IECJTC 1/SC 29/WG 11 11th Meeting Ljubljana, SI, Jul. 10-18, 2018, CE3-related: Advanced MPM based on intra reference line selection scheme (Year: 2018).*

Chen et al. Algorithm description for Versatile Video Coding and Test Model 1 (VTM 1), Joint Video ExpertsTeam (JVET) of ITU-T SG 16 WP 3 and ISO/IEC JTC 1/SC 29/WG11, 10th Meeting: San Diego, US, Apr. 10-20, 2018. (Year: 2018).*

Chen J. and E. Alshina Algorithm description for Versatile Video Coding and Test Model 1 (VTM 1), Joint Video Experts Team (JVET) of ITU-T SG 16 WP 3 and ISO/IECJTC 1/SC 29/WG 11, 10th Meeting: San Diego, US, Apr. 10-20, 2018 (Year: 2018).*

International Search Report from the International Bureau in counterpart International Application No. PCT/US2019/047011, dated Sep. 24, 2019.

Written Opinion from the International Bureau in counterpart International Application No. PCT/US2019/047011, dated Sep. 24, 2019.

Geert Van der Auwera et al., "Description of Core Experiment 3: Intra Prediction and Mode Coding", JVET of ITU-T SG 16 WP 3 and ISO/IEC JTC 1/SC 29/WG 11, JVET-J1023_r2, Apr. 10-20, 2018 (50 pages total).

Jung Won Kang et al., "Description of SDR video coding technology proposal by ETRI and Sejong University", Joint Video Experts Team (JVET) of ITU-T SG 16 WP 3 and ISO/IEC JTC 1/SC 29/WG 11, JVET-J0013-v1, Apr. 10-20, 2018 (41 pages total).

Jinho Lee et al., "CE3: Multi-line based intra prediction (Test 5.3.1, 5.3.2, 5.3.3)", Joint Video Experts Team (JVET) of ITU-T SG 16 WP 3 and ISO/IEC JTC 1/SC 29/WG 11, JVET-K0166-v1, Jul. 10-18, 2018 (4 pages total).

Yi Wen Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, JVET-J0021, Apr. 10-20, 2018 (43 pages total).

Communication dated Dec. 10, 2019, from the European Patent Office in application No. 19861175.8.

Jianle Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document: JVET-F1001-v3, 6th Meeting: Hobart, AU, Mar. 31-Apr. 7, 2017 (5 pages total).

Notice of Reasons for Refusal dated Dec. 14, 2021 from the Japanese Patent Office in JP Application No. 2020-561054.

Liang Zhao et al., "CE3-related: MPM based multi-line intra prediction scheme", Joint Video Exploration Team (JVET) of ITU-T SG 16 WP 3 and ISO/IEC JTC 1/SC 29/WG 11, 11th Meeting: Ljubljana, SI, 10-18 2018, JVET-K0482_r1 (3 pages total).

Office Action dated Jul. 15, 2022 issued by the Korean Patent Office in Korean Application No. 10-2020-7031582.

* cited by examiner

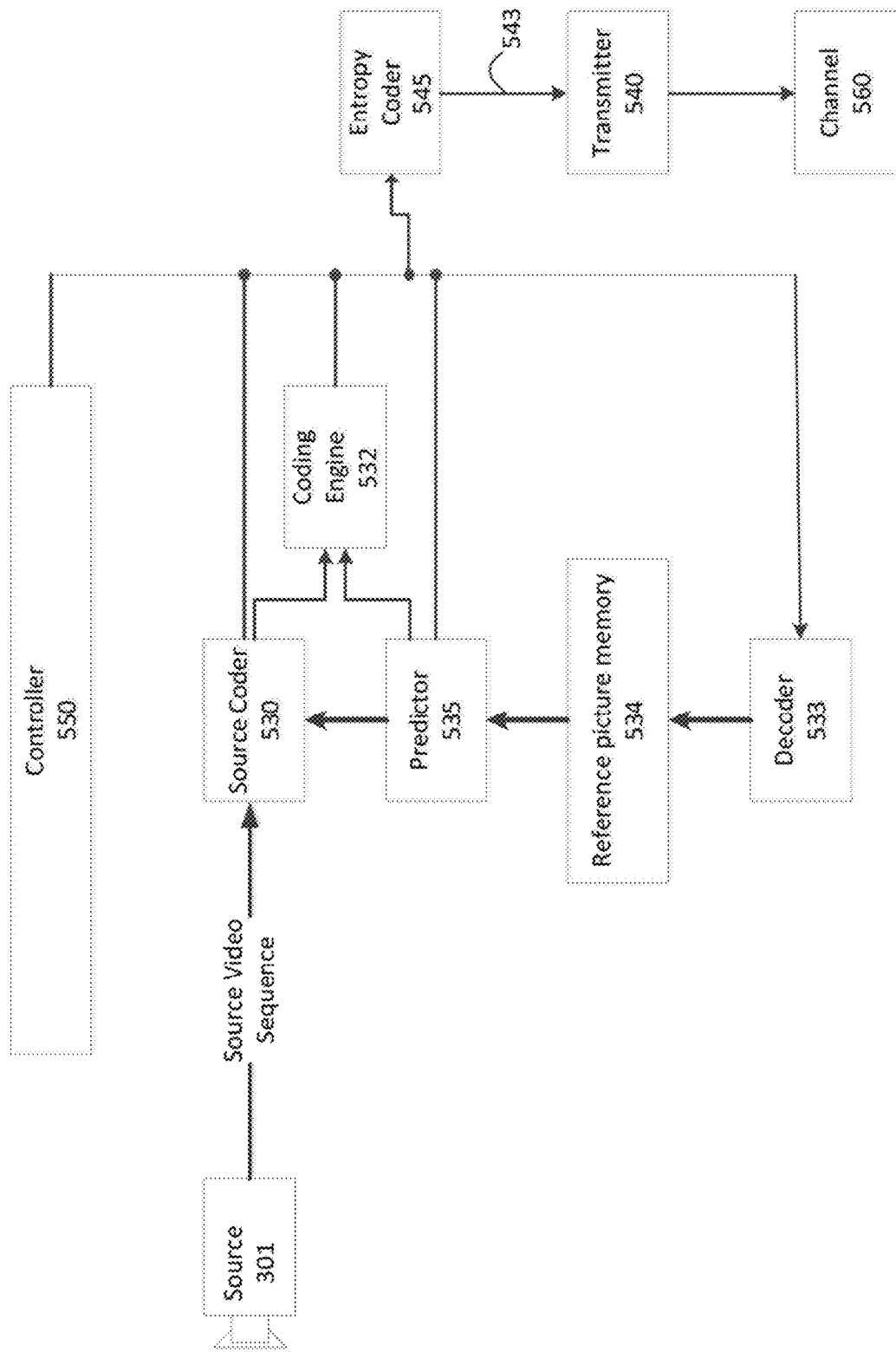
FIG. 5  Encoder 303

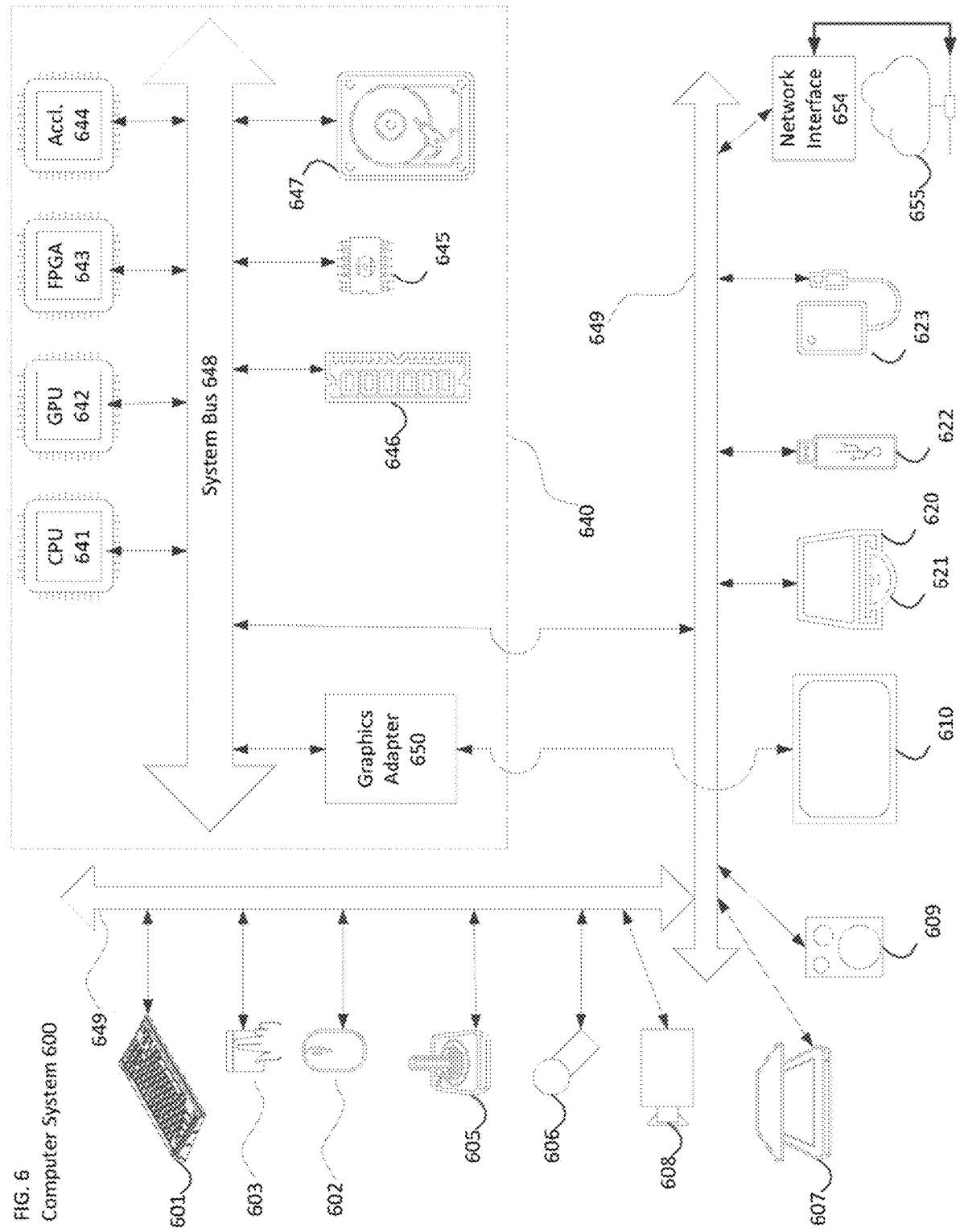

INTRA INTERPOLATION FILTER FOR MULTI-LINE INTRA PREDICTION

CROSS-REFERENCE TO RELATED APPLICATION

This application is a continuation of U.S. application Ser. No. 16/202,902, filed Nov. 28, 2018, which claims priority under 35 U.S.C. § 119 from U.S. Provisional Application No. 62/729,395, filed on Sep. 10, 2018 in the U.S. Patent & Trademark Office, the disclosures of which are incorporated herein by reference in their entirety.

FIELD

The present disclosure is directed to a set of advanced video coding technologies. More specifically, the present disclosure provides a modified intra interpolation filter scheme for multi-line intra prediction.

BACKGROUND

ITU-T VCEG (Q6/16) and ISO/IEC MPEG (JTC 1/SC 29/WG 11) promulgated the H.265/HEVC (High Efficiency Video Coding) standard in 2013 (version 1), and provided updates in 2014 (version 2), 2015 (version 3), and 2016 (version 4). Since, the ITU has been studying the potential need for standardization of future video coding technology with a compression capability that significantly exceeds that of the HEVC standard (including its extensions).

In October 2017, the ITU issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted, respectively.

In April 2018, all received CfP responses were evaluated in the 122 MPEG/10$^{th}$ JVET (Joint Video Exploration Team—Joint Video Expert Team) meeting. With careful evaluation, JVET formally launched the standardization of next-generation video coding beyond HEVC, i.e., the so-called Versatile Video Coding (VVC).

In HEVC, there is a total of 35 intra prediction modes, among which mode 10 is a horizontal mode, mode 26 is a vertical mode, and modes 2, 18 and 34 are diagonal modes. The intra prediction modes are signalled by three most probable modes (MPMs) and 32 remaining modes.

In the current development of VVC, there is a total of 87 intra prediction modes, where mode 18 is a horizontal mode, mode 50 is a vertical mode, and modes 2, 34 and 66 are diagonal modes. Modes 1 through 10 and modes 67 through 76 are designated Wide-Angle Intra Prediction (WAIP) modes.

To code an intra mode, a most probable mode (MPM) list of 3 modes is generated based on the intra modes of the neighboring blocks. This MPM list will be referred to as the MPM list or primary MPM list. If an intra mode is not included in the MPM list, a flag is signalled to indicate whether the intra mode belongs to the selected modes.

In the development of VVC, the implementation of a primary MPM list together with a secondary MPM list is proposed. The modes in the secondary MPM list are not included in primary MPM list. The number of modes in the MPM list can be 3, 4, 5, 6, 7, 8, etc. whereas the number of modes in the secondary MPM list can be 8, 16, 32, etc.

In VVC, for the luma component, the neighboring samples used for intra prediction sample generations are filtered before the generation process, namely the intra smoothing process. The filtering is controlled by the given intra prediction mode and transform block size. If the intra prediction mode is DC, or if the transform block size is equal to 4×4, then the neighboring samples are not filtered. Further, if the distance between the given intra prediction mode and the vertical mode (or horizontal mode) is larger than a predefined threshold, then the filtering process is enabled. For neighboring sample filtering, [1, 2, 1] filters and bi-linear filters are used. For example, VVC draft 2 clause 8.2.4.2.4 and Table 8-4 describe the intra smoothing process proposed in VVC.

Multi-line intra prediction was proposed to use additional reference lines for intra prediction, and the encoder can decide and signal which reference line is used to generate the intra predictor. The reference line index is signaled before the intra prediction modes, and Planar/DC modes are excluded from the intra prediction modes in a situation where a non-zero reference line index is signaled.

Wide angles beyond the range of prediction directions covered by conventional intra prediction modes are proposed, and are called wide angular intra prediction modes. These wide angles are only applied for non-square blocks as follows: angles beyond 45 degrees in a top-right direction (intra prediction mode 34 in HEVC) if a block width is larger than block height; and angles beyond 45 degrees in a bottom-left direction (intra prediction mode 2 in HEVC) if a block height is larger than block width.

The replaced modes are signaled using the original method and remapped to the indices of wide angular modes after parsing. The total number of intra prediction modes is unchanged, i.e., 35 as in VTM-1.0, or 67 as in BMS-1.0, and the intra mode coding is unchanged.

A bilateral filter is a non-linear, edge-preserving, and noise-reducing smoothing filter for images. It replaces the intensity of each pixel with a weighted average of intensity values from nearby pixels. This weight can be based on a Gaussian distribution. The weights depend on Euclidean distances of pixels, and also on the radiometric differences (e.g., range differences, such as color intensity, depth distance, etc.). Bilateral filters help preserves sharp edges. Given original (unfiltered) reference samples I(x) of an intra block, the bilateral filter function might be defined as:

$$\hat{I}(x) = \frac{\sum_{\Delta x_i \leq s} w_{pos}(\Delta x_i) \cdot w_{val}(\Delta I_i) \cdot I(x_i)}{\sum_{\Delta x_i \leq s} w_{pos}(\Delta x_i) \cdot w_{val}(\Delta I_i)}$$

4-tap and 6-tap intra interpolation filters were proposed to generate the prediction samples for directional intra prediction. Two types of four-tap interpolation filters are used, which are Cubic interpolation filters and Gaussian interpolation filters. Cubic filters are adept for reserving the image edges, whereas Gaussian interpolation filters are adept at removing image noise. Cubic interpolation filters are implemented as follows: when intra prediction mode is equal to or larger than Diagonal mode (i.e., mode 34) and the width of the block is smaller than or equal to 8; and when intra prediction mode is equal to or smaller than Diagonal mode (i.e., mode 34) and the height of the block is smaller than or equal to 8.

Gaussian filters are implemented when the intra prediction mode is equal to or larger than Diagonal mode (i.e., mode 34) and the width of the block is larger than 8; and when the intra prediction mode is equal to or smaller than the diagonal mode (i.e., mode 34) and the height of the block is larger than 8.

SUMMARY

A method for selecting an intra interpolation filter for multi-line intra prediction based on a reference line index for decoding a video sequence includes identifying a set of reference lines associated with a coding unit; applying a first type of interpolation filter to reference samples included in a first reference line, of the set of reference lines, that is adjacent to the coding unit to generate a first set of prediction samples based on the first reference line being associated with a first reference line index; and applying a second type of interpolation filter to reference samples included in a second reference line, of the set of reference lines, that is non-adjacent to the coding unit to generate a second set of prediction samples based on the second reference line being associated with a second reference line index A device for selecting an intra interpolation filter for multi-line intra prediction based on a reference line index for decoding a video sequence, comprising: at least one memory configured to store program code; at least one processor configured to read the program code and operate as instructed by the program code, the program code including: identifying code configured to cause the at least one processor to identify a set of reference lines associated with a coding unit; first applying code configured to cause the at least one processor to apply a first type of interpolation filter to reference samples included in a first reference line, of the set of reference lines, that is adjacent to the coding unit to generate a first set of prediction samples based on the first reference line being associated with a first reference line index; and second applying code configured to cause the at least one processor to apply a second type of interpolation filter to reference samples included in a second reference line, of the set of reference lines, that is non-adjacent to the coding unit to generate a second set of prediction samples based on the second reference line being associated with a second reference line index.

A non-transitory computer-readable medium storing instructions, the instructions comprising: one or more instructions that, when executed by one or more processors of a device for selecting an intra interpolation filter for multi-line intra prediction based on a reference line index for decoding a video sequence, cause the one or more processors to: identify a set of reference lines associated with a coding unit; apply a first type of interpolation filter to reference samples included in a first reference line, of the set of reference lines, that is adjacent to the coding unit to generate a first set of prediction samples based on the first reference line being associated with a first reference line index; and apply a second type of interpolation filter to reference samples included in a second reference line, of the set of reference lines, that is non-adjacent to the coding unit to generate a second set of prediction samples based on the second reference line being associated with a second reference line index.

BRIEF DESCRIPTION OF THE DRAWINGS

Further features, the nature, and various advantages of the disclosed subject matter will be more apparent from the following detailed description and the accompanying drawings in which:

FIG. 5 is a functional block diagram of a video encoder according to an embodiment of the present disclosure.

FIG. 6 is a diagram of a computer system in accordance with an embodiment.

PROBLEM TO BE SOLVED

Gaussian filters are adept for smooth image areas and Cubic filter are adept for areas with edges. The addition of additional reference lines used in multi-line intra prediction is helpful for areas with edges. However, it is not a desirable design to apply both the same cubic and Gaussian filters to all reference lines.

DETAILED DESCRIPTION

Figure 1:
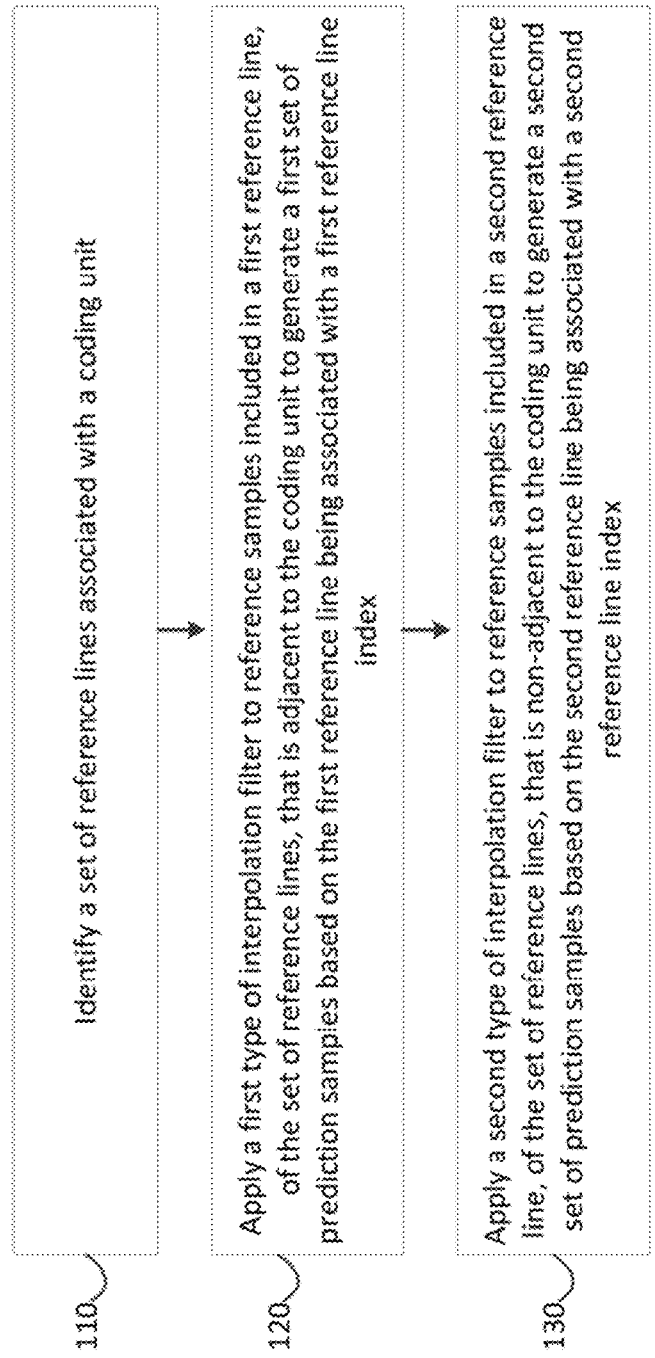
FIG. 1 is a flowchart of an example process for selecting an intra interpolation filter for multi-line intra prediction based on a reference line index for decoding a video sequence.

FIG. 1 is a flowchart of an example process 100 for selecting an intra interpolation filter for multi-line intra prediction based on a reference line index for decoding a video sequence. In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, process 100 may include identifying a set of reference lines associated with a coding unit (block 110).

In some implementations, a line index of the nearest reference line is 0 (zero reference line). Additionally, the maximum signaled reference line number is denoted as N. The intra interpolation filters discussed below refer to the interpolation filters used to generate prediction values which point to fractional positions of the reference samples.

In some implementations, the selection of intra interpolation filters is dependent on the reference line index wherein a reference line index is signaled. The types of intra interpolation filters include edge preserving filters and edge smoothing filters, and/or the like. Edge smoothing filters include linear interpolation filters having positive or zero filter coefficients. Edge preserving filters include linear interpolation filters with at least one or two negative filter coefficients, or non-linear filters, e.g., bilateral filter.

As further shown in FIG. 1, process 100 may include applying a first type of interpolation filter to reference samples included in a first reference line, of the set of reference lines, that is adjacent to the coding unit to generate a first set of prediction samples based on the first reference line being associated with a first reference line index (block 120); and applying a second type of interpolation filter to reference samples included in a second reference line, of the set of reference lines, that is non-adjacent to the coding unit to generate a second set of prediction samples based on the second reference line being associated with a second reference line index (block 130).

According to an embodiment, both edge smoothing filters and edge preserving filters are applied to the zero reference line, and only edge preserving filters are applied to non-zero reference lines. Additionally, edge smoothing filters can include bilinear filters or Gaussian filters.

According to an embodiment, edge preserving filters can be Cubic, DCT-based interpolation filters (DCT-IF), 4/6-tap polynomial-based interpolation filters, bilateral filters, Hermite interpolation filters, and/or the like.

According to an embodiment, the edge preserving filters used for different lines are different. For example, the tap of an edge preserving filter can be different for the zero reference line and non-zero reference lines. Additionally, or alternatively, an M-tap edge preserving filter can be used for the zero reference line whereas an N-tap edge preserving filter can be used for non-zero reference lines (e.g., where M and N are positive integers and M is not equal to N). Additionally, or alternatively, the filter coefficients of the edge preserving filters used for different reference lines can be different.

In another embodiment, the coefficients of edge preserving filters and edge smoothing filters are fixed, and are not dependent on the sample values.

In some implementations, the selection of intra interpolation filters is dependent on the reference line index and other coded or any information available to both the encoder and the decoder, such as intra prediction modes and block sizes.

According to an embodiment, edge preserving filters are used based on a condition being satisfied. For example, the condition may be satisfied when the intra prediction mode is equal to or greater than the diagonal mode (i.e., mode 34) and the width of the block is smaller than or equal to S. Additionally, or alternatively, the condition may be satisfied when the intra prediction mode is equal to or less than the diagonal mode (i.e., mode 34) and the height of the block is smaller than or equal to S. For example, S may indicate the threshold for block width or height. S can be different for different lines. For example, according to an embodiment, S is 8 for the zero reference line, and S is 16 or 32 for non-zero reference lines.

According to an embodiment, edge smoothing filters are used for wide angles in the zero reference line whereas edge preserving filters are used for wide angles in the non-zero reference lines. Additionally, or alternatively, edge preserving filters are used for wide angles in the zero reference line whereas edge smoothing filters are used for wide angles in non-zero reference lines.

According to an embodiment, both edge preserving and smoothing filters are applied to the zero reference lines, and/or there is at least one reference line for which either edge preserving filters or edge smoothing filters are applied. In this case, both filters might not be applied. According to an embodiment, when there are 3 reference lines, where line indices can be {0,1,2} or {0,1,3}, both edge preserving and edge smoothing filters are applied to line 0, only an edge preserving or smoothing filter is applied to line 1, and only an edge smoothing or preserving filter is applied to lines 2 or 3.

According to an embodiment, both edge preserving filters and edge smoothing filters are applied to all reference lines, but the tap number of intra interpolation filters can be different for different lines. For example, in an embodiment, an edge preserving filter for zero reference line is M-tap whereas the edge preserving filter for the non-zero reference lines is N-tap (e.g., where M and N are positive integers, and M is not equal to N, such as M=6 and N=4). Additionally, or alternatively, the edge smoothing filter for the zero reference line is M-tap, whereas the edge smoothing filter for non-zero reference lines is N-tap (e.g., where M and N are positive integers, and M is not equal to N, such as M=6 and N=4).

According to an embodiment, wide angles are disabled or defined differently for certain reference lines. For example, wide angles are disabled for non-zero reference lines. Additionally, or alternatively, there is at least one reference line where wide angles are not used. Additionally, or alternatively, wide angles used for different reference lines are different. For example, the number of conventional angular intra prediction directions which are replaced by wide angle intra prediction directions is dependent on the reference line index.

According to an embodiment, the intra smoothing filter can be different for different lines. For example, a bilateral filter is used for intra smoothing on non-zero reference lines. Additionally, or alternatively, an intra smoothing filter is disabled for non-zero reference lines when the reference line index is signaled. Additionally, or alternatively, there is at least one reference line for which a bilateral filter is used for intra smoothing.

According to an embodiment, the filter tap number of an intra smoothing filter is different for different lines. For example, the filter tap number of intra smoothing filter for the zero reference line is M, whereas the filter tap number of an intra smoothing filter for non-zero reference lines is N (e.g., where M and N are positive integers, and M is not equal to N, such as M=6 and N=4).

According to an embodiment, the intra prediction modes which apply intra smoothing are different for different reference lines. For example, a threshold value T defines which intra prediction modes apply intra smoothing, when an intra prediction mode Mode meets the condition: min (abs(Mode−Hor), abs(Mode−Ver))<T, where "Hor" refers to the intra prediction mode index of Horizontal mode, and "Ver" refers to the intra predication mode index of Vertical mode. The value of T depends on the reference line index and other coded or any information known to both the encoder and the decoder, examples include but are not limited to: block area size, block width, block height, block width to height ratio, and/or the like.

According to an embodiment, only MPM modes are allowed for non-zero reference lines, including both the primary and secondary MPM lists. In one embodiment, when the reference line index of a current block is greater than zero, one bin is signaled to indicate whether the intra prediction mode of the current block belongs to the primary MPM list or the secondary MPM list, which is called "primay_mpm_flag." If "primary_mpm_flag" is "true," then the primary MPM index is signaled. Otherwise, the secondary MPM index is signaled. No non-MPM modes are used for non-zero reference lines, and no flag is signaled to indicate whether the secondary MPM or the non-MPM is used.

According to an embodiment, Planar and DC modes are excluded from the primary MPM list and the secondary MPM list.

According to an embodiment, some implementations use more than one context for coding the first bin of the reference line index. For example, the selection of the context is dependent on the reference line index of the neighboring blocks. As a particular example, if both the reference line index of the left and above blocks is equal to zero, then context 0 is selected, else if both the reference line index of the left and above blocks are not equal to zero, then context 1 is selected. Otherwise, context 2 is selected.

According to an embodiment, the selection of the context is dependent on the CBF (coded block flag) of the neighboring blocks. CBF is the indicator of whether the current block contains non-zero coefficients. If CBF is equal to zero, then no non-zero coefficients exist in the current block. In one example, if both the CBF of the left and above blocks are equal to zero, the context 0 is selected. Else, if both CBF of the left and above blocks are not equal to zero, then context 1 is selected. Otherwise, context 2 is selected.

According to an embodiment, the context used for coding the transform selection information, including but not limited to: MTS flag, MTS index, NSST index, depends on the reference line index value.

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
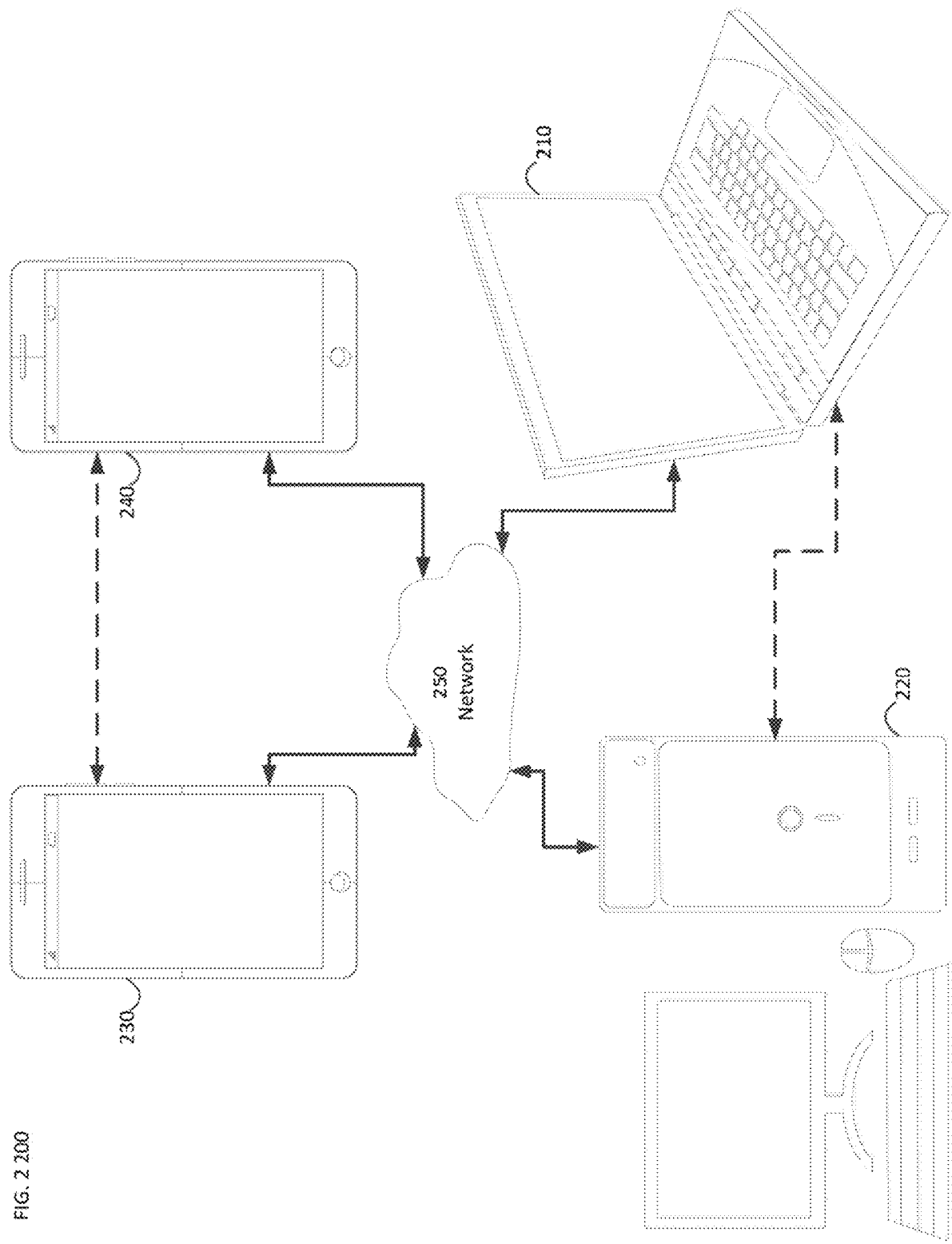
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
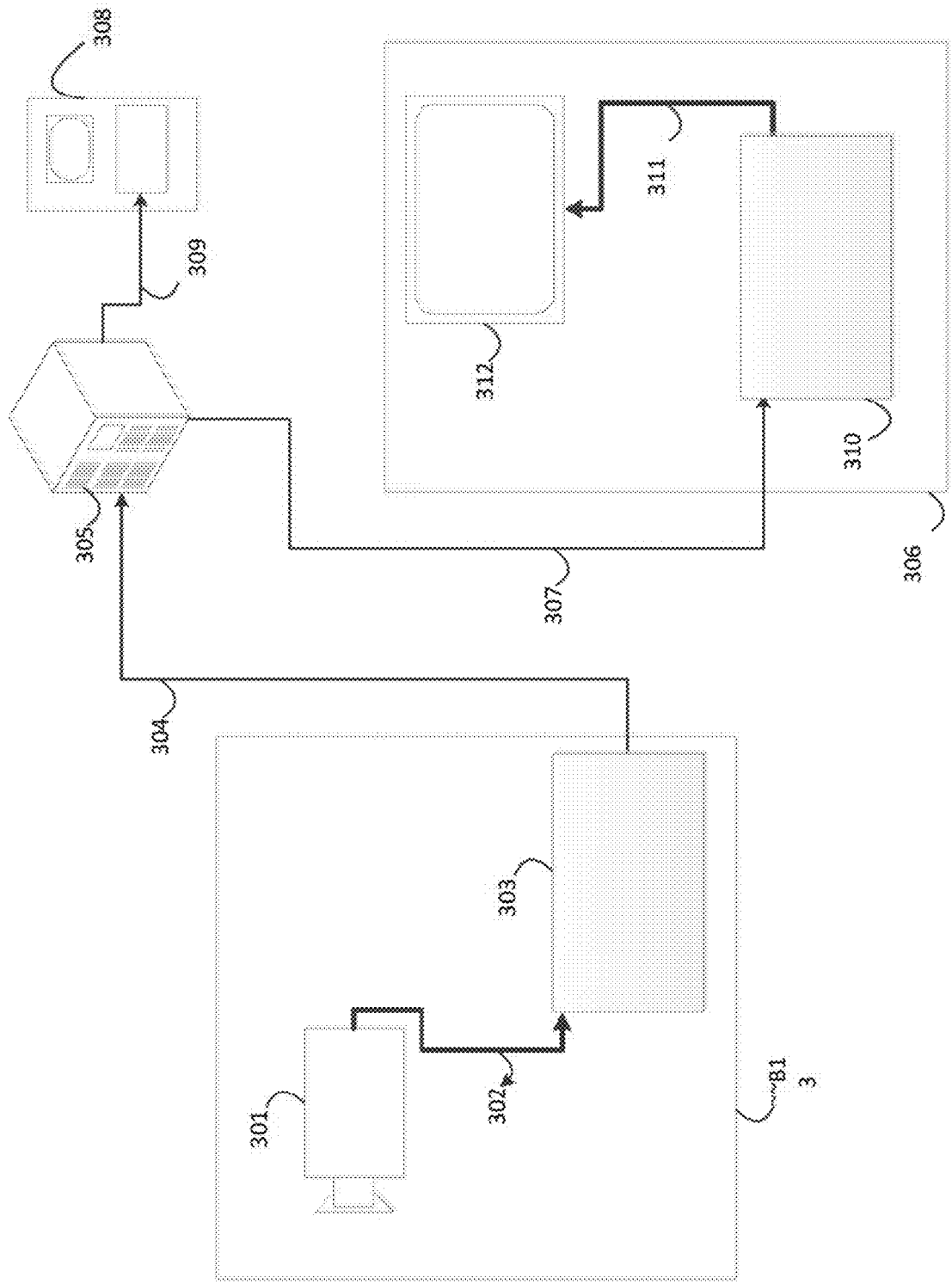
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
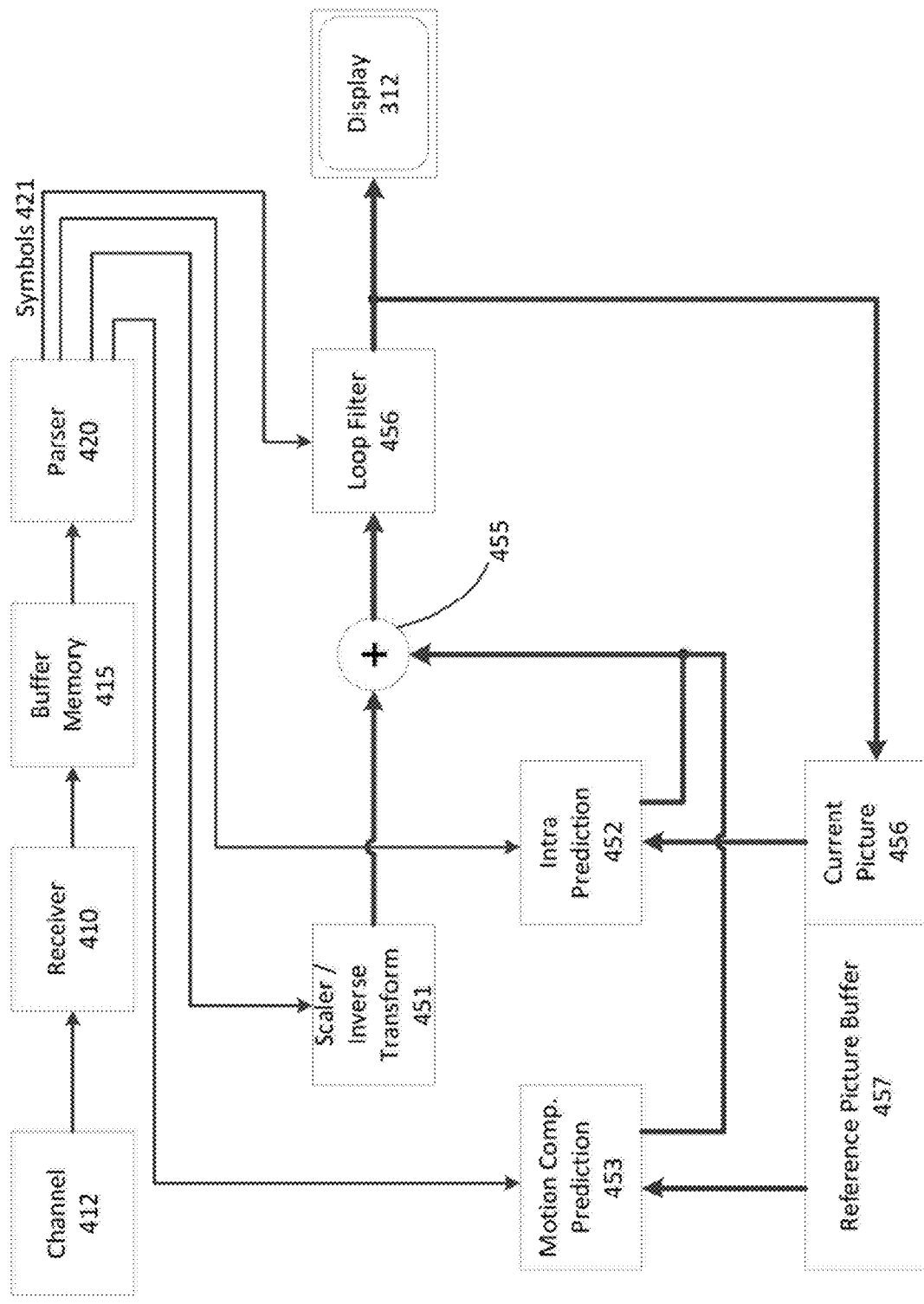
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method performed by at least one processor for selecting an intra interpolation filter for multi-line intra prediction based on a reference line index for decoding of a video sequence, the method comprising:
   identifying a set of reference lines associated with a coding unit;
   applying both an edge smoothing filter with only positive or zero coefficients and an edge preserving filter to reference samples included in a first reference line, of the set of reference lines, that is adjacent to the coding unit to generate a first set of prediction samples based on the first reference line being associated with a first reference line index; and
   applying only the edge preserving filter but not the edge smoothing filter to reference samples included in a second reference line, of the set of reference lines, that is non-adjacent to the coding unit to generate a second set of prediction samples based on the second reference line being associated with a second reference line index.

2. The method of claim 1, wherein the edge smoothing filter comprises a linear interpolation filter having only positive or zero filter coefficients, and
wherein the edge preserving filter comprises at least one of a linear interpolation filter having at least one or two negative filter coefficients, a non-linear filter, or a bilateral filter.

3. The method of claim 1, wherein the first reference line has a first reference line index having a value of zero.

4. The method of claim 1, wherein the edge preserving filter comprises at least one of a Cubic filter, a discrete cosine transform (DCT)-based filter, a polynomial-based interpolation filter, a bilateral filter, and a Hermite interpolation filter.

5. The method of claim 1, wherein the second reference line has a second reference line index having a non-zero value.

6. The method of claim 1, wherein a first tap number of the edge smoothing filter is different than a second tap number of the edge preserving filter.

7. The method of claim 1, further comprising:
signaling a reference line index before intra prediction modes, wherein the signaled intra prediction modes excludes planar modes, and wherein the reference line index indicates which reference line is used for intra prediction.

8. A device for selecting an intra interpolation filter for multi-line intra prediction based on a reference line index for decoding of a video sequence, comprising:
at least one memory configured to store program code;
at least one processor configured to read the program code and operate as instructed by the program code, the program code including:
identifying code configured to cause the at least one processor to identify a set of reference lines associated with a coding unit;
first applying code configured to cause the at least one processor to apply both an edge smoothing filter with only positive or zero coefficients and an edge preserving filter to reference samples included in a first reference line, of the set of reference lines, that is adjacent to the coding unit to generate a first set of prediction samples based on the first reference line being associated with a first reference line index; and
second applying code configured to cause the at least one processor to apply only the edge preserving filter but not the edge smoothing filter to reference samples included in a second reference line, of the set of reference lines, that is non-adjacent to the coding unit to generate a second set of prediction samples based on the second reference line being associated with a second reference line index.

9. The device of claim 8, wherein the edge smoothing filter comprises a linear interpolation filter having only positive or zero filter coefficients, and
wherein the edge preserving filter comprises at least one of a linear interpolation filter having at least one or two negative filter coefficients, a non-linear filter, or a bilateral filter.

10. The device of claim 8, wherein the first reference line has a first reference line index having a value of zero.

11. The device of claim 8, wherein the edge preserving filter comprises at least one of a Cubic filter, a discrete cosine transform (DCT)-based filter, a polynomial-based interpolation filter, a bilateral filter, and a Hermite interpolation filter.

12. The device of claim 8, wherein the second reference line has a second reference line index having a non-zero value.

13. The device of claim 8, wherein a first tap number of the edge smoothing filter is different than a second tap number of the edge preserving filter.

14. The device of claim 8, further comprising:
signaling code configured to cause the at least one processor to signal a reference line index before intra prediction modes, wherein the signaled intra prediction modes excludes planar modes, and wherein the reference line index indicates which reference line is used for intra prediction.

15. A non-transitory computer-readable medium storing computer program code for selecting an intra interpolation filter for multi-line intra prediction based on a reference line index for decoding of a video sequence that, when executed by one or more processors of a device, cause the one or more processors to at least:
identify a set of reference lines associated with a coding unit;
apply both an edge smoothing filter with only positive or zero coefficients and an edge preserving filter to reference samples included in a first reference line, of the set of reference lines, that is adjacent to the coding unit to generate a first set of prediction samples based on the first reference line being associated with a first reference line index; and
apply only the edge preserving filter but not the edge smoothing filter to reference samples included in a second reference line, of the set of reference lines, that is non-adjacent to the coding unit to generate a second set of prediction samples based on the second reference line being associated with a second reference line index.

16. The non-transitory computer-readable medium of claim 15, wherein the edge smoothing filter comprises a linear interpolation filter having only positive or zero filter coefficients, and
wherein the edge preserving filter comprises at least one of a linear interpolation filter having at least one or two negative filter coefficients, a non-linear filter, or a bilateral filter.

17. The non-transitory computer-readable medium of claim 15, wherein the first reference line has a first reference line index having a value of zero.

18. The non-transitory computer-readable medium of claim 15, wherein the edge preserving filter comprises at least one of a Cubic filter, a discrete cosine transform (DCT)-based filter, a polynomial-based interpolation filter, a bilateral filter, and a Hermite interpolation filter.

19. The non-transitory computer-readable medium of claim 15, wherein the second reference line has a second reference line index having a non-zero value.

20. The non-transitory computer-readable medium of claim 15, wherein a first tap number of the edge smoothing filter is different than a second tap number of the edge preserving filter.

* * * * *